(12) United States Patent
Li et al.

(10) Patent No.: US 12,380,563 B2
(45) Date of Patent: Aug. 5, 2025

(54) CONVEX-LINEAR BI-PLANE PROBE AND ITS APPLICATION METHOD IN PROSTATE VOLUME CALCULATION

(71) Applicant: Shantou Institute of Ultrasonic Instruments Co., Ltd., Shantou (CN)

(72) Inventors: Delai Li, Shantou (CN); Liexiang Fan, Shantou (CN); Jinhao Lin, Shantou (CN); Zehang Cai, Shantou (CN); Bin Li, Shantou (CN); Yu Wang, Shantou (CN); Shutian Su, Shantou (CN); Zhonghong Wu, Shantou (CN); Xurui Zeng, Shantou (CN); Peifeng Chen, Shantou (CN)

(73) Assignee: Shantou Institute of Ultrasonic Instruments Co., Ltd., Shantou (CN)

( * ) Notice: Subject to any disclaimer, the term of this patent is extended or adjusted under 35 U.S.C. 154(b) by 376 days.

(21) Appl. No.: 18/299,614

(22) Filed: Apr. 12, 2023

(65) Prior Publication Data
US 2023/0386040 A1    Nov. 30, 2023

Related U.S. Application Data

(63) Continuation of application No. PCT/CN2022/096893, filed on Jun. 2, 2022.

(30) Foreign Application Priority Data

May 30, 2022    (CN) .......................... 202210595840.1

(51) Int. Cl.
*G06T 7/00* (2017.01)
*G06T 7/20* (2017.01)

(52) U.S. Cl.
CPC .............. *G06T 7/0016* (2013.01); *G06T 7/20* (2013.01); *G06T 2207/10132* (2013.01); *G06T 2207/30081* (2013.01)

(58) Field of Classification Search
None
See application file for complete search history.

(56) References Cited

U.S. PATENT DOCUMENTS

| 6,517,491 B1 | 2/2003 | Thiele et al. |
| 2007/0167796 A1 | 7/2007 | Yoshimura |

(Continued)

FOREIGN PATENT DOCUMENTS

| CN | 1956681 A | 5/2007 |
| CN | 202015189 U | 10/2011 |

(Continued)

OTHER PUBLICATIONS

Jang et al., "Design and Fabrication of a Miniaturized Convex Array for Combined Ultrasound and Photoacoustic Imaging of the Prostate," in IEEE Transactions on Ultrasonics, Ferroelectrics, and Frequency Control, vol. 65, No. 11, pp. 2086-2096, Nov. 2018, doi: 10.1109/TUFFC.2018.2864664. (Year: 2018).*

(Continued)

*Primary Examiner* — Michelle M Koeth
(74) *Attorney, Agent, or Firm* — Westbridge IP LLC (57) ABSTRACT

Disclosed are a convex-linear bi-plane probe and its application method in prostate volume calculation. The present invention adopts the following technical solution: comprising a probe housing and a probe assembly contained in the probe housing, the probe assembly comprising a linear probe and a convex probe contained at the end of the linear probe, with the linear element inside the linear probe and the convex element inside the convex probe connected as one piece. The benefits of the present invention are that: by setting a convex probe at the end of the linear probe, and by connecting the linear element and the convex element as one, the volume of the probe can be significantly reduced. Furthermore, the use of convex-linear biplane probe and its integrated design collect two orthogonal ultrasound images of the prostate, which improves the accuracy of prostate volume calculation.

3 Claims, 5 Drawing Sheets

(56) References Cited

U.S. PATENT DOCUMENTS

| | | | |
|---|---|---|---|
| 2019/0219693 | A1 | 7/2019 | Lieblich et al. |
| 2020/0196984 | A1 | 6/2020 | Sprung et al. |
| 2025/0017662 | A1* | 1/2025 | Shi .......................... A61B 8/00 |

FOREIGN PATENT DOCUMENTS

| | | | |
|---|---|---|---|
| CN | 111432733 | A | 7/2020 |
| CN | 215534529 | U | 1/2022 |
| CN | 215534626 | U | 1/2022 |

OTHER PUBLICATIONS

First Office Action issued in counterpart Chinese Patent Application No. 202210595840.1, dated Jul. 5, 2022.
International Search Report and Written Opinion issued in corresponding PCT Application No. PCT/CN2022/096893, dated Jan. 4, 2023.
Notification to Grant Patent Right for Invention issued in counterpart Chinese Patent Application No. 202210595840.1, dated Aug. 29, 2022.
Second Office Action issued in counterpart Chinese Patent Application No. 202210595840.1, dated Jul. 27, 2022.
Terris, Determination of Prostate Volume by Transrectal Ultrasound, The Journal of Urology, vol. 145, pp. 984-987, dated May 31, 1991.

* cited by examiner

CONVEX-LINEAR BI-PLANE PROBE AND ITS APPLICATION METHOD IN PROSTATE VOLUME CALCULATION

CROSS-REFERENCE TO RELATED APPLICATIONS

This application is a continuation of International Application No. PCT/CN2022/096893, filed on Jun. 2, 2022, which claims priority to Chinese Patent Application No. 202210595840.1, filed on May 30, 2022. All of the aforementioned applications are incorporated herein by reference in their entireties.

TECHNICAL FIELD

The present invention relates to the field of ultrasonic testing technology, in particular to a convex-linear bi-plane probe and its application method in prostate volume calculation.

BACKGROUND

Prostate volume measurement is of great significance to the prostate clinical practice, and the assessment of prostate status such as prostate enlargement and carcinogenesis according to prostate size plays an important role in preoperative diagnosis, planning and postoperative examination. The existing ultrasound methods for calculating prostate volume are mainly divided into the following four categories: 1) based on conventional intracavity probes to find the maximum prostate section perpendicular to each other, and calculate the prostate volume through empirical formula; 2) the volume of the prostate is calculated after direct scanning and reconstruction based on the two-dimensional matrix probe; 3) the volume of the prostate is calculated after freehand three-dimensional reconstruction of the prostate based on the convex-linear biplane probe; 4) based on the two-dimensional image sequence sampling driven by the motor driven by the one-dimensional probe, the prostate volume is calculated after the three-dimensional reconstruction of the prostate.

The above four methods have the following defects: 1) the method of calculating the volume of the prostate section with the largest area perpendicular to each other based on conventional intracavity probes needs to manually determine the position of the largest section of the prostate, and there is human error that may result in deviation in the calculation results of prostate volume; 2) the method of calculating the volume of direct 3D scanning and reconstruction based on two-dimensional matrix probe is expensive to use, and has high requirements for both the probe and the main unit; 3) the method of calculating the volume of the freehand prostate three-dimensional reconstruction based on the biconvex biplane probe must ensure the clarity of the acquired images because of the three-dimensional reconstruction by tracking, but due to its own structural design of the probe, the probe is manually rotated and the prostate section image collected by the two planes shall be kept clear at the same time, and the probe rotation speed has strict requirements, which is more demanding for the user; 4) the two-dimensional image sequence sampling and three-dimensional reconstruction calculation volume method based on the motor driving the one-dimensional probe generally uses a larger probe than the conventional probe, which will bring more discomfort to the patient than the conventional probe during the three-dimensional examination.

SUMMARY

The purpose of the present invention is to provide a convex-linear bi-plane probe and its application method in prostate volume calculation, specifically providing a convex-linear bi-plane probe that can simultaneously acquire two orthogonal images of the prostate and the application method of such probe in the prostate volume calculation.

In order to achieve the above purpose, the present invention adopts the following technical solution: a convex-linear bi-plane probe comprising a probe housing and a probe assembly contained in the probe housing, the probe assembly comprising a linear probe and a convex probe contained at the end of the linear probe, with the linear element inside the linear probe and the convex element inside the convex probe connected.

Specifically, the linear element is vertically arranged, the convex element horizontally arranged, and the thickness of the convex element is not equal to the thickness of the linear element, An application method of the above-mentioned convex-linear bi-plane probe in prostate volume calculation, including the following steps:

S01, using the convex-linear bi-plane probe to acquire ultrasound images of the prostate, and acquiring ultrasound images by the convex probe and the linear probe at the same time; in which the linear probe collects sagittal images of the prostate, and the convex probe collects cross-sectional images of the prostate.

S02, performing ultrasound image acquisition in Step S01, the convex-linear bi-plane probe is rotated or moved forward, and then the median sagittal image of the prostate with the largest section area is obtained from the median sagittal image of the prostate collected by the linear probe, and the cross-sectional image with the largest prostate section area is obtained in the cross-sectional image of the prostate collected by the convex probe.

S03, obtaining the anteroposterior diameters, upper and lower diameters, and the left and right diameters of the prostate according to the median sagittal plane image and cross-sectional image of the largest section area of the prostate obtained in step S02.

S04, calculating the volume of the prostate by the formula according to the anteroposterior diameter, upper and lower diameter and left and right diameter of the prostate.

Another application method of the above-mentioned convex-linear bi-plane probe in prostate volume calculation includes the following steps:

S11, using the convex-linear bi-plane probe to acquire ultrasound images of the prostate, and acquiring ultrasound images by the convex probe and the linear probe at the same time. Images acquired by the convex probe and images collected by the linear probe are orthogonal in the actual space. During the image acquisition process, the convex-linear bi-plane probe starts to rotate from the edge position of one end of the prostate and pans forward to the edge position of the other end of the prostate, meanwhile the displacement sensor and angle sensor are set on the convex-linear bi-plane probe to record the motion information of the probe during image acquisition.

S12, collecting prostate ultrasound images by the convex probe and reconstructing the linear probe in three dimensions to obtain two prostate models according to the motion information of the probe in step S11, and compounding the two prostate models to form an accurate prostate model.

S13, calculating the volume of the prostate according to the accurate prostate model obtained in step S12.

Specifically, the scanning frequencies of the convex probe and the line probe of the convex-linear biplane probe in the S11 are different.

Specifically, in step S11, the convex-linear bi-plane probe is used to learn the motion information of the probe based on the image information acquired by the probe and compare it with the actual motion information acquired by the displacement sensor and the angle sensor, until the consistency between the motion information of the probe output by the neural network model and the actual detected probe motion information complies with the set requirements. The subsequent operation does not need to set up the displacement sensor and the angle sensor on the convex-linear bi-plane probe to collect the probe motion information, but directly use the output of the neural network model probe motion information.

The benefits of the present invention is that: by setting a convex probe at the end of the linear probe, and by connecting the linear element and the convex element as one, the volume of the probe can be significantly reduced, and the discomfort caused by the probe to the patient during the image acquisition process can be greatly reduced; furthermore the use of convex-linear biplane probe and its integrated design collect two orthogonal ultrasound images of the prostate, which improves the accuracy of prostate volume calculation.

DETAILED DESCRIPTIONS OF THE EMBODIMENTS

Figure 1:
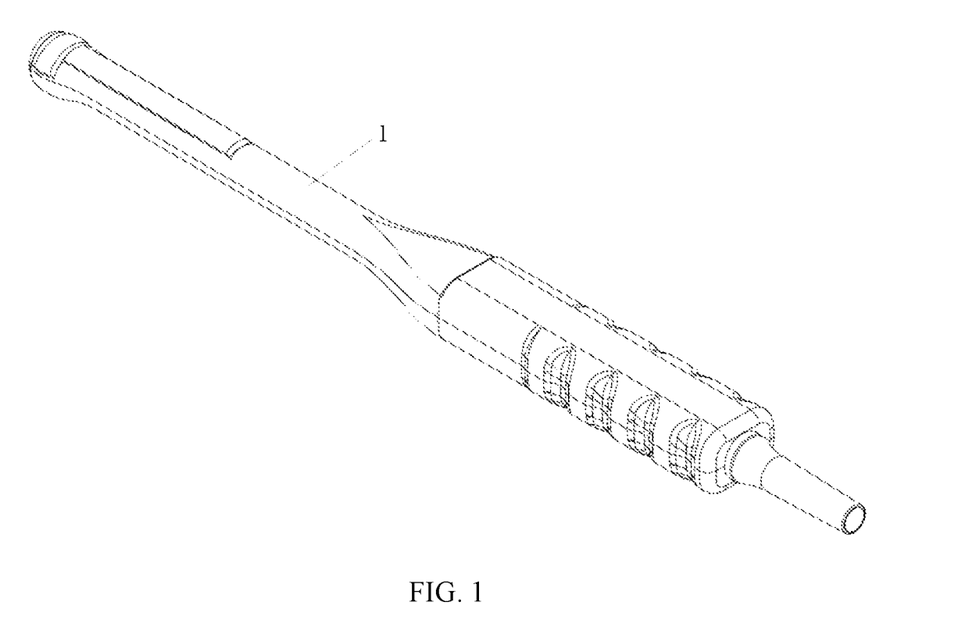
FIG. 1 illustrates the shape and structure of the convex-linear bi-plane probe in Embodiment 1.
Figure 2:
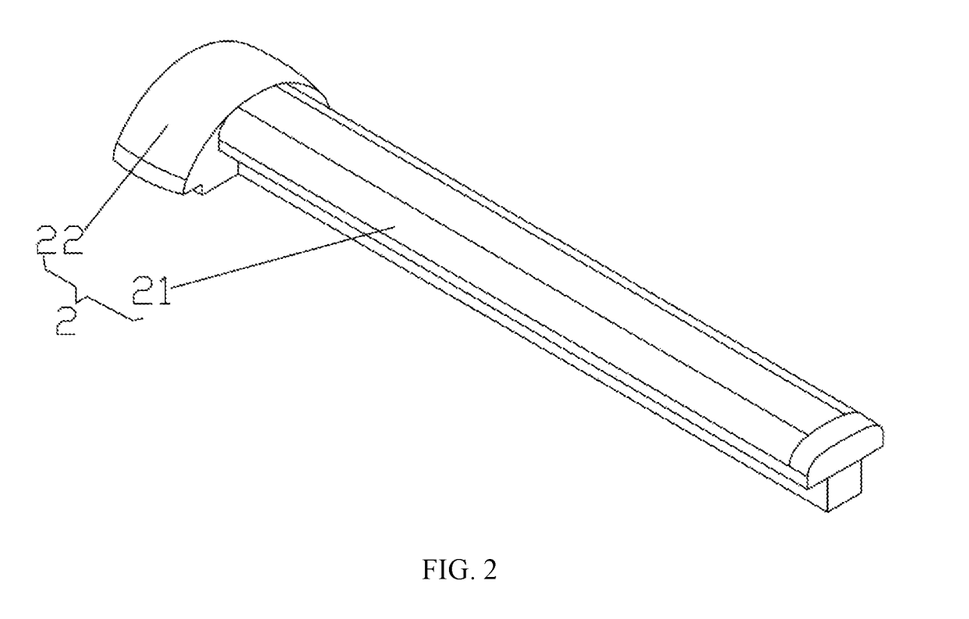
FIG. 2 illustrates an overall structure diagram of the probe assembly in Embodiment 1.
Figure 3:
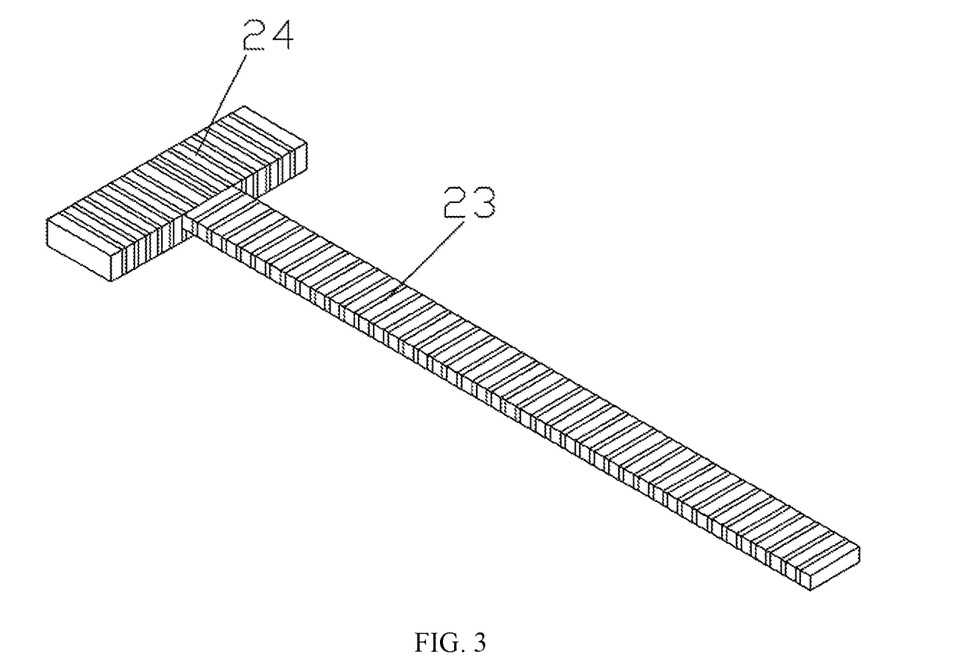
FIG. 3 illustrates a structural diagram of the linear array element and the convex array element in Embodiment 1.

Embodiment 1, referring to FIGS. 1-3, is a convex-linear biplane probe, comprising a probe housing 1 and a probe assembly 2 contained in the probe housing 1, probe assembly 2 comprising a linear probe 21 and a convex probe 22 contained at the end tip of the linear probe 21, with the linear element 23 inside the linear probe 21 and the convex element 24 inside the convex probe 22 connected.

In the present embodiment, the probe assembly 2 in the convex-linear biplane probe includes a linear probe 21 and a convex probe 22, the convex probe 22 is contained at the end of the linear probe 21, the convex probe 22 and the linear probe 21 may perform ultrasound image acquisition at different angles at the same time, so that more ultrasound image information can be collected at one time, effectively improving the efficiency of prostate image acquisition, and because the convex element 24 of the convex probe 22 and the linear element 23 of the linear probe 21 are connected, The convex probe 22 and the linear probe 21 can be seamlessly connected, which not only reduces the overall volume of the probe, but also minimizes the depth of insertion into the rectum during the exam process, and reduces the discomfort caused to the patient.

Specifically, the linear element is vertically arranged, the convex element horizontally arranged, which makes the image acquired by the convex probe 22 and the linear probe 21 orthogonal, therefore the prostate can be inspected more accurately. Moreover the thickness of the convex element 24 and the thickness of the linear element 23 is not equal, for the crystal of the same material, the crystal vibration frequencies of different thicknesses is different, and the scanning frequencies of the probe is also different, so that the frequencies of the image acquired by the convex probe 22 and the linear probe 21 are also different. In this way, the images of different frequencies collected by the convex array probe 22 and the linear array probe 21 can be used for compound comparison to improve the accuracy of the probe for prostate exams.

Wherein the linear element 23 and the convex element 24 are thinned by a T-shaped integrated crystal through the crystal thinning process to the linear element 23 or convex element 24 (so that the thickness of the linear element and the convex element is different). Moreover, the fine laser cutting process is used to cut the T-shaped crystal in the two array directions of convex array probe 22 and linear array probe 21. Generally, the thickness of linear element 23 is smaller than the thickness of convex element 24, which makes the vibration frequency of linear element 23 higher than convex element 24.

Figure 4:
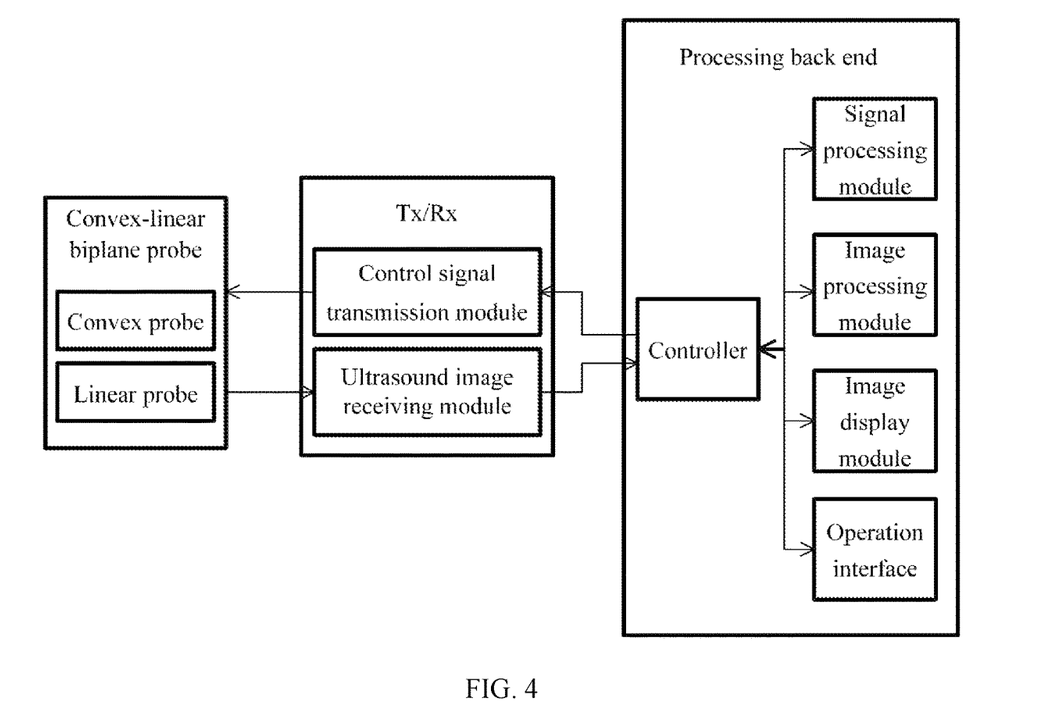
FIG. 4 illustrates a connection schematic of the acquisition system in Embodiment 1.

Referring to FIG. 4, the probe disclosed in the present embodiment will be connected with the transceiver front end and the processing back end to form an acquisition system for use when performing ultrasonic image acquisition; Specifically, the transceiver front end includes a control signal transmitting module and an ultrasonic image receiving module, and the processing back end includes a controller, a signal processing module, an image processing module, an image display module and an operation interface. The transceiver front end is connected to the convex-linear bi-plane probe and the processing back end for signal transmission, the processing back end sends a control signal to the probe through the control signal transmitting module of the transceiver front end, and the probe sends ultrasonic image signals to the processing back end through the ultrasonic image receiving module of the transceiver front end. It is processed and displayed by the processing backend through the signal processing module, image processing module and image display module; Since the convex-linear bi-plane ultrasonic probe in the present embodiment is provided with a convex probe and a linear probe, the processing back end can control the convex-linear bi-plane probe for ultrasonic image acquisition in three modes: single convex probe, single linear probe or biplane probe by sending out the corresponding control signals.

Figure 5:
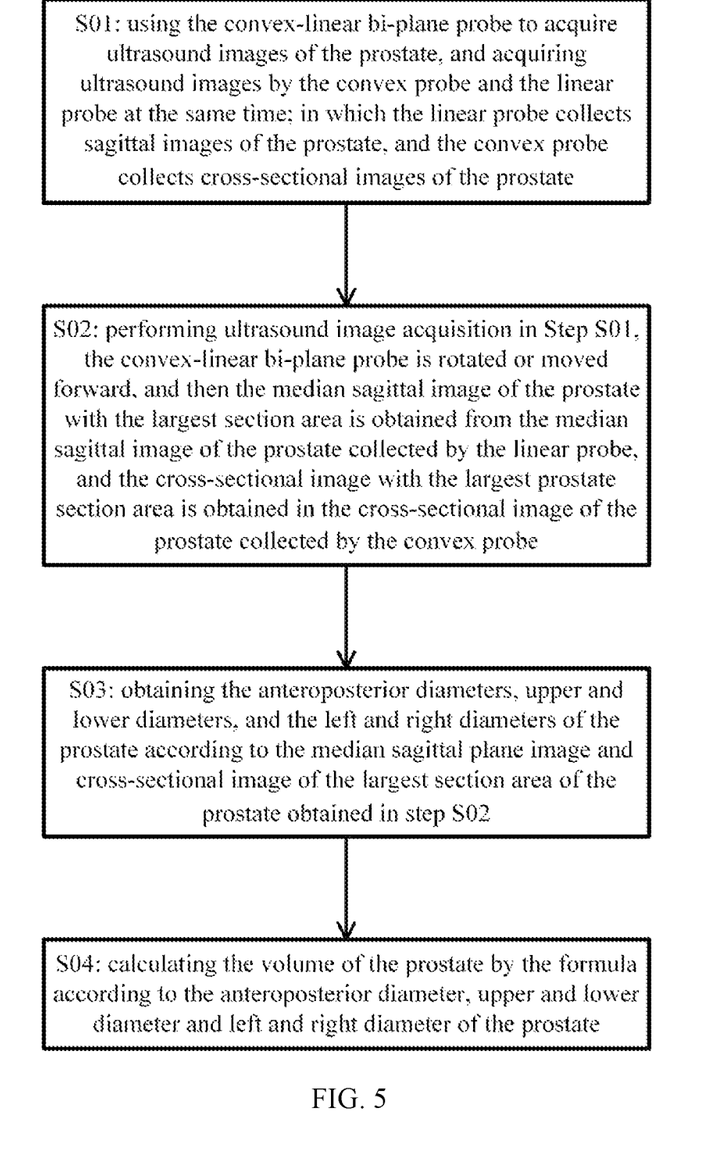
FIG. 5 illustrates a flow chart of the application method of the probe in prostate volume calculation in Embodiment 2.

Embodiment 2, referring to FIG. 5, is a method for calculating the volume of the prostate using a convex-linear bi-plane probe disclosed in Embodiment 1 above, comprising the following steps:

S01, using the convex-linear bi-plane probe of Embodiment 1 to acquire ultrasound images of the prostate, and performing ultrasonic image acquisition by using the convex probe and the linear probe of the convex-linear bi-plane probe simultaneously, wherein the linear probe collects sagittal images of the prostate, and the convex probe collects cross-sectional images of the prostate.

S02, performing ultrasound image acquisition in Step S01, the convex-linear bi-plane probe is rotated or moved forward, and then the median sagittal image of the prostate with the largest section area is obtained from the median sagittal image of the prostate collected by the linear probe, and the cross-sectional image with the largest prostate section area is obtained in the cross-sectional image of the prostate collected by the convex probe. Only by rotating the probe to determine the linear probe to collect the median sagittal images of the prostate, and then move the probe back and forth, the linear probe can collect median sagittal images of the prostate, and when the probe is moved back and forth, the convex probe can collect cross-sectional images of the prostate.

S03, obtaining the anteroposterior diameters, upper and lower diameters, and the left and right diameters of the prostate according to the median sagittal plane image and cross-sectional image of the largest section area of the prostate obtained in step S02.

S04, calculating the volume of the prostate by formula according to the anteroposterior diameter, upper and lower diameter and left and right diameter of the prostate. After obtaining the anteroposterior diameter, upper and lower diameter and left and right diameter of the prostate, the prostate volume can be calculated by using the empirical formula, and the empirical formula is: prostate volume=anteroposterior diameter*upper and lower diameter*left and right diameter*$\pi$/6.

Figure 6:
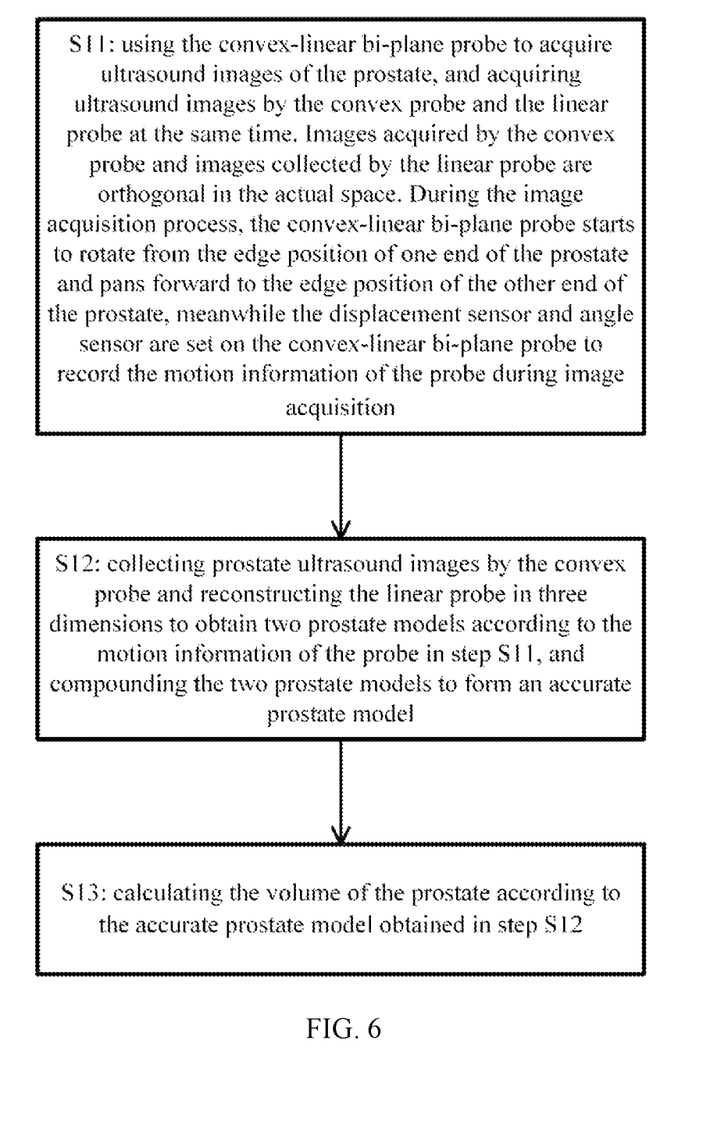
FIG. 6 illustrates a flow chart of the application method of the probe in prostate volume calculation in Embodiment 3.
Figure 7:
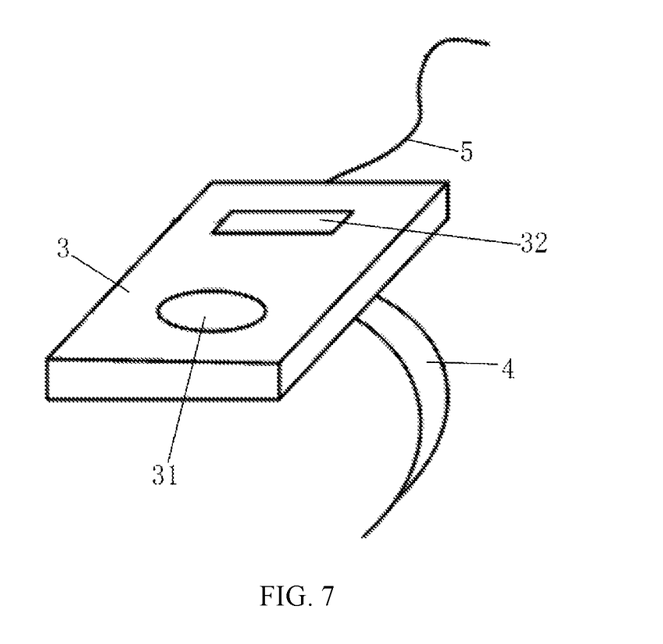
FIG. 7 illustrates a structural diagram of the add-on accessory of the sensor in Embodiment 3.

Embodiment 3, referring to FIG. 6, is a method for calculating the volume of the prostate using a convex-linear bi-plane probe disclosed in Embodiment 1 above, comprising the following steps:

S11, using the convex-linear bi-plane probe of Embodiment 1 to acquire ultrasound images of the prostate, and the convex probe and linear probe of the convex-linear bi-plane probe simultaneously perform ultrasonic image acquisition; wherein the image acquired by the convex probe and the image collected by the linear probe are orthogonal in the actual space. During the image acquisition process, the convex-linear bi-plane probe starts to rotate from the edge position of one end of the prostate and pans forward to the edge position of the other end of the prostate, meanwhile the displacement sensor and angle sensor are set on the convex-linear bi-plane probe to record the motion information of the probe during image acquisition. Wherein the position sensor and angle sensor can be fixed on the convex-linear biplane probe by the sensor add-on accessory, referring to FIG. 7, the sensor add-on accessory is composed of the accessory body 3 and the snap 4, the accessory body 3 is provided with a displacement sensor and an angle sensor, and the accessory body 3 is fixed on the convex-linear bi-plane probe through the snap 4, the accessory body 3 is connected to the processing transceiver front end in Embodiment 1 for signal transmission through the data transmission line 5, the accessory body 3 can be set on the button 31 and the display 32 for sensor add-on accessory control and display, through the button 31 to control whether the sensor add-on accessory starts, and the display 32 may display information about the sensor add-on.

S12, collecting the prostate ultrasound images by the convex probe and reconstructing the linear probe in three dimensions to obtain two prostate models according to the motion information of the probe in step S11, and compounding the two prostate models to form an accurate prostate model.

S13, calculating the volume of the prostate according to the accurate prostate model obtained in step S12.

Specifically, the scanning frequencies of the convex probe and the line probe of the convex-linear biplane probe in the S11 are different. Due to the different scanning frequencies of convex probe and linear probe, the frequencies of image acquisition during image acquisition of convex probe and linear probe is also different, therefore when the two prostate models are obtained after three-dimensional reconstruction of the images acquired by the convex probe and linear probe in step S12, a more accurate prostate model can be obtained, thereby improving the accuracy of prostate volume calculation.

Also, in step S11, using the convex-linear bi-plane probe to learn the motion information of the probe based on the image information acquired by the probe and compare it with the actual motion information acquired by the displacement sensor and the angle sensor, until the consistency between the motion information of the probe output by the neural network model and the actual detected probe motion information complies with the set requirements. The subsequent operation does not need to set up the displacement sensor and the angle sensor on the convex-linear bi-plane probe to collect the probe motion information, but directly use the output of the neural network model probe motion information.

Certainly the embodiments above are preferred for the present invention only, but not intended to restrict the scope of use of the present invention. Therefore, any equivalent changes made on the principles of the present invention should be included in the protection scope of the present invention.

What is claimed is:

1. An application method of a convex-linear biplane probe in prostate volume calculation, comprising:

S11, using the convex-linear bi-plane probe comprising a convex probe and a linear probe, to acquire ultrasound images of the prostate, and acquiring the ultrasound images by the convex probe and the linear probe at the same time;

among them, images acquired by the convex probe and images collected by the linear probe are orthogonal in actual space;

during the image acquisition process, the convex-linear bi-plane probe starts to rotate from an edge position of one end of the prostate and pans forward to an edge position of the other end of the prostate, meanwhile a displacement sensor and an angle sensor are set on the convex-linear bi-plane probe to record motion information of the convex-linear bi-plane probe during image acquisition;

wherein a linear element inside the linear probe and a convex element inside the convex probe are connected as one, the linear element is vertically arranged, the convex element horizontally arranged, and the thickness of the convex element is not equal to the thickness of the linear element, so that the scanning frequency of the convex probe and the linear probe are different;

among them, the linear element and the convex element are thinned by a T-shaped crystal through a crystal thinning process to the linear element or convex element, so that the thicknesses of the linear element and the convex element are different, and the vibration frequencies of the linear element and the convex element are different;

moreover, a fine laser cutting process is used to cut the T-shaped crystal in two array directions of the convex probe and linear probe;

S12, collecting the prostate ultrasound images of different frequencies by the convex probe and reconstructing the linear probe in three dimensions to obtain two prostate models according to the motion information of the convex-linear bi-plane probe in step S11, and the two prostate models are compounded to form an accurate prostate model; and S13, calculating the volume of the prostate according to the accurate prostate model obtained in step S12.

2. The application method according to claim 1, wherein the motion information of the convex-linear bi-plane probe is learnt by a neural network model using based on the image information acquired by the convex-linear bi-plane probe and is compared with the motion information detected by the displacement sensor and the angle sensor in step S11, until the consistency between the motion information output by the neural network model and the detected probe motion information complies with set requirements, wherein subsequent operation does not set up the displacement sensor and the angle sensor on the convex-linear bi-plane probe to collect the motion information, but directly uses the output of the neural network model motion information.

3. The application method according to claim 1, wherein an angle between the convex probe and the linear probe is 90 degrees.

* * * * *